Figure 1:
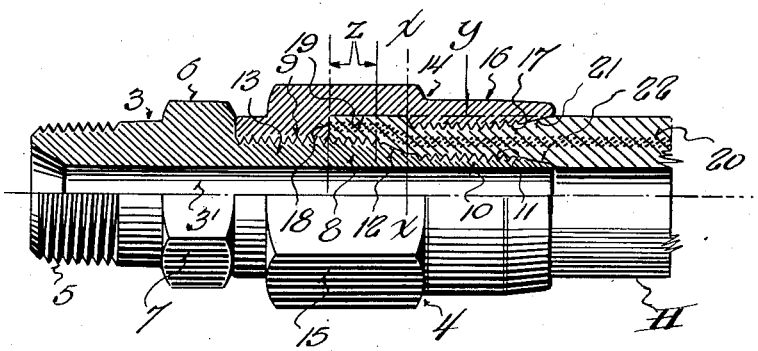

Feb. 19, 1957 — D. F. STRANBERG — 2,782,059
REUSEABLE HOSE COUPLINGS
Filed Sept. 20, 1951

INVENTOR.
Don F. Stranberg
BY
Attorney

United States Patent Office 2,782,059
Patented Feb. 19, 1957

2,782,059

REUSEABLE HOSE COUPLINGS

Don F. Stranberg, Waukegan, Ill., assignor to Charles L. Conroy, Waukegan, and Walter Fritsch, Libertyville, Ill.

Application September 20, 1951, Serial No. 247,487

1 Claim. (Cl. 285—247)

This invention relates to hose couplings, and more particularly to reuseable couplings for high, medium or low pressure non-metallic hose, preferably having an intermediate layer of metallic or fabric reinforcing braid, or conventional wire helix reinforcement.

In couplings permanently attached by mechanically operated crimping or swedging dies, the problem of assembly is comparatively simple. However, reuseable couplings are designed largely for emergency removal and attachment in the field by means of ordinary hand tools, such as wrenches, vices, and the like, and in order to obtain necessary compression of the hose carcass between the coupling insert and shell, a serious problem presents itself in assembling, because of limited power or force available by use of hand tools.

For example, U. S. Letters Patents No. 2,399,791 and No. 2,476,480 disclose two-piece reuseable couplings in which the zone of compression of the hose wall occurs intermediate the ends of the coupling shell and at points spaced from the end of the hose. Consequently, the hose is placed under maximum compression considerably prior to completion of the assembling operation, thus requiring excessive force to completely project the insert into the hose, with a resultant tendency to cause cold flow of the hose toward the outer end of the coupling. This is particularly true in couplings such as shown in Patent No. 2,476,480 in which a substantial portion of the expanding end of the insert is smooth.

The present invention has primarily for its object to overcome the foregoing difficulties by the provision of a two-piece reuseable coupling requiring a minimum amount of manual force to assemble, and resultant maximum compression of the hose wall.

Incidental to the foregoing, a more specific object of the invention is to provide a two-piece reuseable coupling in which maximum compression of the hose wall is created in the end portion of the hose upon completion of the assembling operation.

With the above and other objects in view, the invention resides in the novel features of construction fully described in the specification, and more particularly defined by the appended claim, it being understood that modifications in structure and design are contemplated within the scope of the invention.

Figure 2:
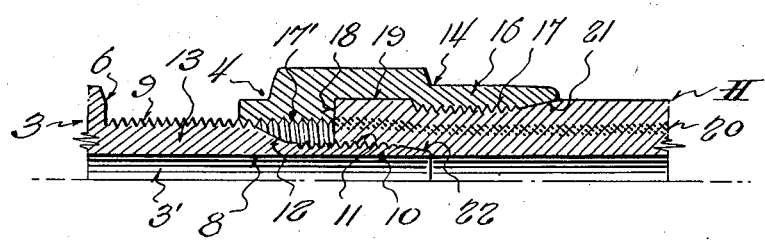

In the drawing:

Figure 1 is a half sectional and half elevational view of a reuseable coupling incorporating principles of the present invention; and Figure 2 is a fragmentary sectional view illustrating the coupling members and hose in partially assembled relation.

Referring now more particularly to the accompanying drawing, the coupling illustrated consists of two members, namely, a connector 3 and a shell 4. The connector 3 comprises a threaded end 5 for attachment to a fitting, and a head 6 provided with a hexagonal or other shaped tool-receiving surface 7. Extending rearwardly from the head 6 is a nipple insert 8, which may be formed integrally with the head 6 as shown, or suitably attached thereto. The inner end 13 of the insert 8, which is cylindrical in shape, is provided with external threads 9, while the outer reduced end 10 of the insert, also cylindrical in shape, is provided with external threads 11 corresponding in pitch to the threads 9. An intermediate portion of the insert, extending between the inner end 13 and outer reduced end 10, provides a conical shoulder 12 to facilitate expansion of the hose over the enlarged portion 13 of the insert. The inner bore 3' of the connector 3 is substantially the same diameter as the inside diameter of the hose H.

Threaded upon the inner end 13 of the insert 8 is a shell 14 provided with an external hexagonal or other shaped tool-receiving surface 15. The inner wall of the outer end 16 of the shell 14 is also cylindrical and provided with threads 17, preferably left hand, or opposed to the pitch of the threads 9 and 11, for the purpose hereinafter explained. Between the threaded outer end 16 of the shell 14 and the inner end 18 of the shell bore, an annular recess 19 is provided for reception of the end of the non-metallic, compressible hose H, the inner diameter of the recess 19 being substantially the same as the outer diameter of the hose H, as indicated by the dot and dash line y on Figure 1. The hose H is provided with an intermediate layer of metal or fabric reinforcing braid 20.

As shown in Figure 1, when the coupling is completely assembled, the conical expanding shoulder 12 of the insert is positioned forwardly of the transverse line $x$—$x$ that defines the outer end of the recess 19. Consequently, the outer end of the enlarged portion 13 that extends into the recess 19, serves to create maximum compression upon the end of the hose between the annular wall of the recess 19 and the enlarged portion 13 of the insert. The zone of maximum compression thus created occurs between the lines $z$, indicated on Figure 1. In addition to the foregoing, a slight compression of the hose wall occurs between the reduced end 10 of the insert 8 and the threaded inner wall of the outer end 16 of the coupling shell 14. To facilitate starting of both the coupling shell and insert on the hose, the outer end of the shell is flared outwardly at 21 and the reduced portion 10 of the insert is provided with a short inwardly tapered end 22. This is conventional.

The assembling operation is simple, and also conventional to the extent that the coupling shell 14 is first assembled upon the outer end of the hose H, after which the insert 8 of the connector 3 is partially inserted into the bore of the hose and subsequently threaded into the coupling shell to complete the assembly.

Figure 2 illustrates the elements of the present coupling partially assembled. In the initial operation the coupling shell 14 is threaded upon the outer periphery of the hose H until the end of the hose abuts the inner wall 18 of the annular recess 19. The shell 14 is then held with a wrench, vice or other hand tool while the reduced threaded end 10 of the insert 8 is turned into the hose bore, which slightly compresses the end of the hose within the recess 19 through expansion of the inner diameter of the hose by the reduced end 10 of the insert. During this operation the threads 11 materially facilitate insertion.

As will be noted in Figure 2, the relative longitudinal dimensions of the shell 14 and insert 8 parts are such that the reduced end 10 of the insert is only partially projected into the hose bore when the threads 9 of the enlarged portion 13 of the insert 8 are engaged by the internal threads 17' of the shell. Obviously, further relative rotation between the coupling shell and insert 8 will cause the shell to travel forwardly on the insert, and at the same time feed the hose H forwardly on the insert, due to the fact that the insert threads 9 and 11 are of the same pitch, and the reverse threads 17 in the outer end 16 of the coupling shell serve to hold the hose H against relative longitudinal and rotatable movement within the shell.

Until such time as the conical expanding shoulder 12 engages the inner diameter of the hose, minimum force is required in projecting the insert into the hose bore, and as the conical expanding shoulder 12 enters the hose bore, the insertion force required gradually increases until the enlarged portion 13 of the insert reaches the hose bore, whereupon maximum compression of the end of the hose is initiated and continues for a relatively short length of travel of the hose on the insert, namely, the distance defined by the lines z in Figure 1, which zone of compression is determined by abutment of the end of the coupling shell against the head 6 of the connector.

From the foregoing explanation, considered in connection with the accompanying drawing, it will be apparent that a highly efficient and easily attachable reuseable coupling has been devised, which affords numerous advantages unattainable in conventional couplings of similar type.

For instance, the annular recess 19 in the coupling shell, being of the same circumferential diameter as the normal outer diameter of the hose, allows the end of the hose to assume its normal condition after assembly of the shell on the hose. This facilitates initial or starting insertion of the nipple insert, inasmuch as the reduced end 10 of the insert creates only slight compression of the end of the hose until such time as the threaded enlarged portion 13 of the insert is engaged by the threads 17' of the coupling shell. Then, as the shell is turned on the insert, or vice versa, compression of the hose is gradually increased as the reduced portion of the insert enters the zone of the threaded bore of the coupling shell. The increased compression thus created continues substantially constant until the enlarged portion 13 of the insert enters the confines of the annular recess 19 to create maximum compression at the end of the hose in the manner heretofore described. Prior to final maximum compression created upon the end of the hose, it will be apparent that the threads 11 on the reduced portion 10 of the insert will securely hold the hose to prevent cold flow of the hose wall material, which occurs in couplings utilizing smooth expanding nipple inserts.

In addition to a high degree of compression created by the larger portion of the insert, the present structure overcomes the problem of tolerance variations encountered in hose. For example, should the total tolerance of the hose be .150, and the diameter of the larger portion of the insert .200 more than the inside diameter of the hose, obviously some degree of compression of the hose wall will be created, regardless where the inner and outer hose diameters fall within the tolerance range.

In addition to the foregoing, the larger portion of the insert projecting from the connector affords a maximum amount of material at that point and in the zone of maximum compression to prevent the insert from breaking due to twisting force applied in assembling.

Lastly, due to the fact that the pitch of threads on the two portions of the nipple insert are the same, chewing of the hose tube by the smaller diameter threads during the assembling operation is eliminated, in that travel of the hose and shell on the insert must be the same.

I claim:

A two-piece reuseable coupling for manual attachment to the end of a non-metallic compressible hose comprising, a fitting connector provided with a nipple insert for projection into the bore of said hose and having spaced coaxial cylindrical portions of different outside diameters and an annular conical expanding shoulder extending between said cylindrical portions, said cylindrical portions having external threads of like pitch, the inner portion adjacent said connector being of larger diameter than the outer portion, a non-deformable shell threaded on the larger portion of said insert and abutting said connector to definitely determine the relative assembled positions of said shell and insert, the outer end of said shell having an internal cylindrical bore of smaller diameter than the normal outer diameter of the hose and having threads of opposed pitch to those of the insert, and an enlarged internal annular recess formed in said shell between its threaded portion and the inner end of its bore, the diameter of said recess being substantially the same as the normal outer diameter of said hose, said hose extending into said shell into abutted engagement with the inner end wall of the shell bore, the enlarged threaded portion of said insert partially extending into the bore of said shell and said conical expanding shoulder being positioned entirely within the longitudinal confines of said annular recess, the enlarged portion of said insert extending into said annular recess cooperating with the circumferential wall of said recess to create a zone of maximum compression of the hose wall at its end, the cylindrical internal threaded portion of said shell cooperating with the reduced cylindrical threaded portion of said insert to compress the hose wall to a lesser degree than the maximum compression of the end of said hose.

References Cited in the file of this patent
UNITED STATES PATENTS

| 2,333,349 | Weatherhead | Nov. 2, 1943 |
| 2,476,480 | Burckle | July 19, 1949 |

FOREIGN PATENTS

| 28,805 | Great Britain | Dec. 12, 1910 |